UNITED STATES PATENT OFFICE.

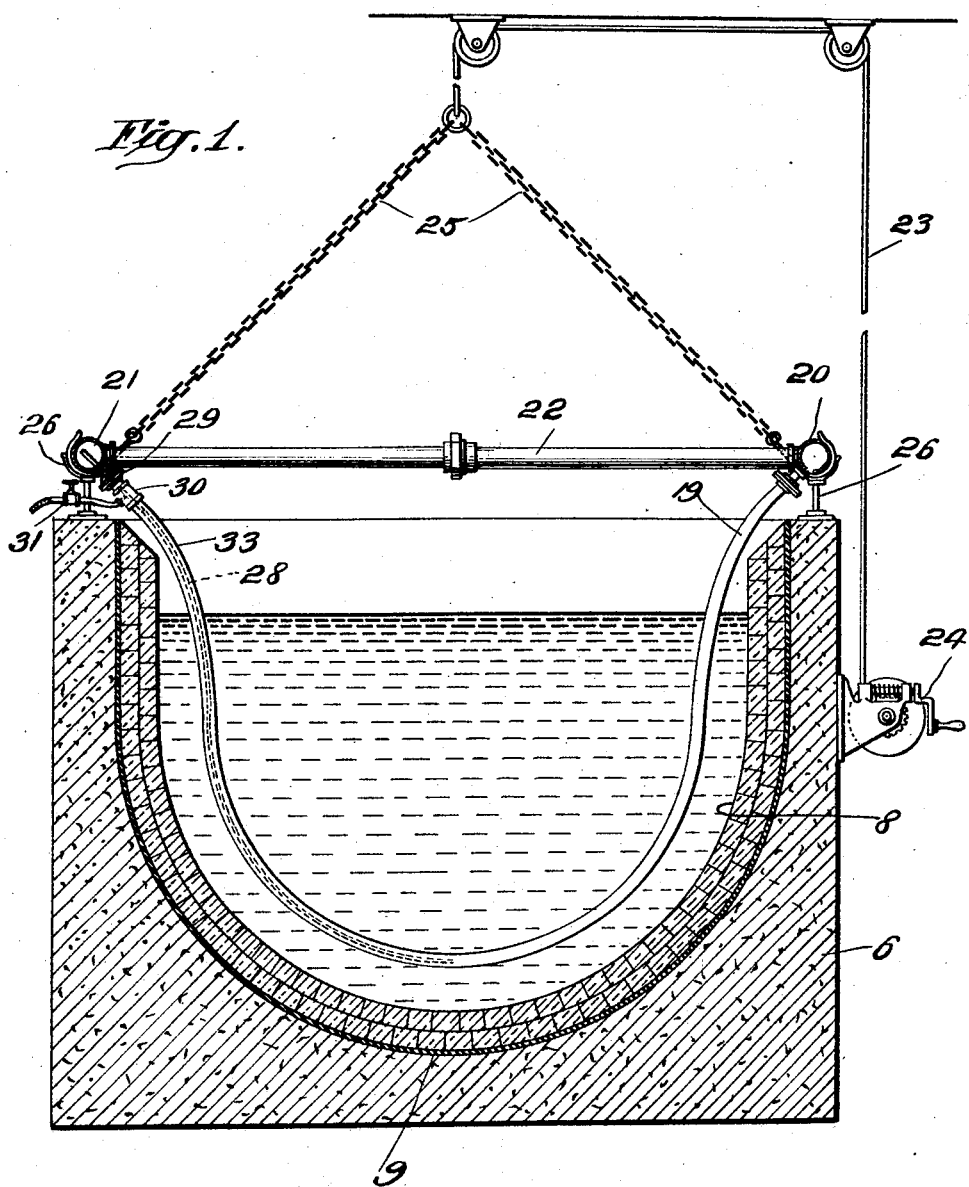

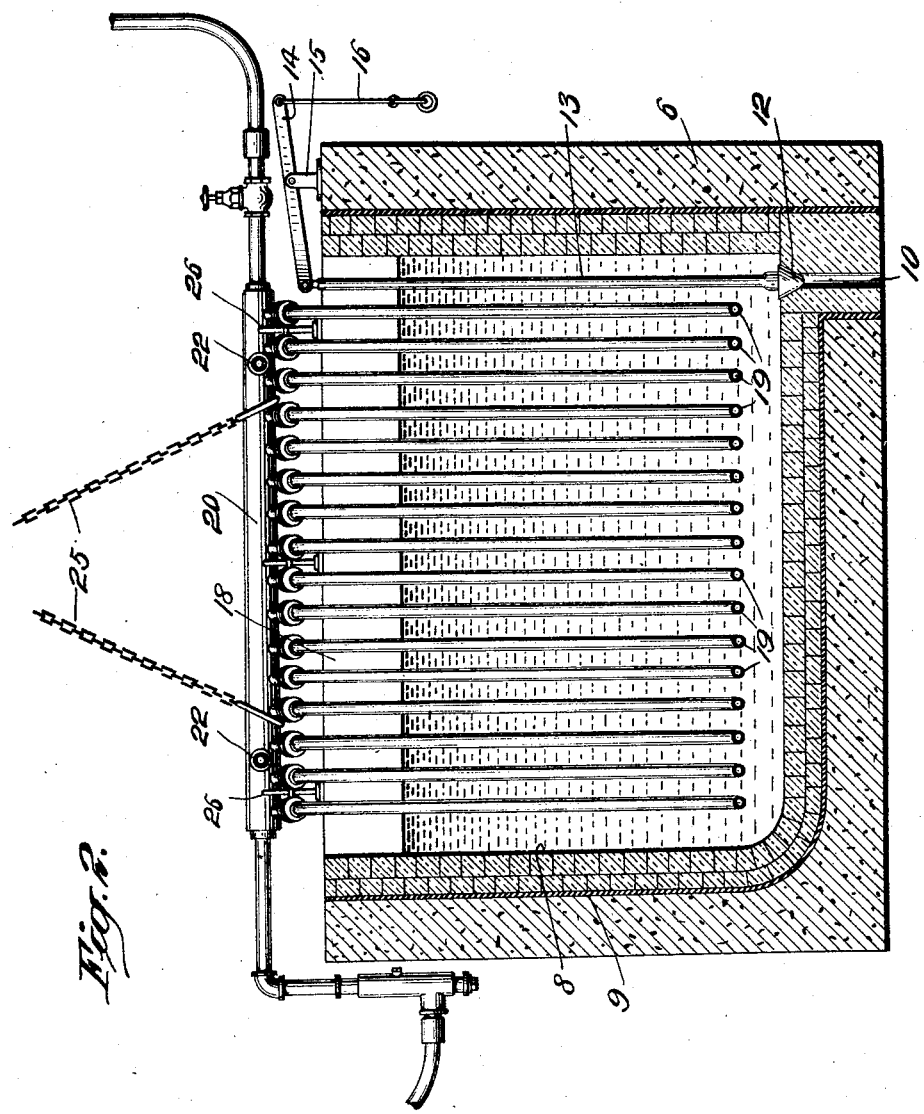

HERMAN W. PAULUS, OF RICHMOND HILL, NEW YORK, ASSIGNOR TO ROYAL BAKING POWDER COMPANY, A CORPORATION OF NEW JERSEY.

EVAPORATOR.

1,418,878. Specification of Letters Patent. Patented June 6, 1922.

Application filed July 26, 1920. Serial No. 399,081.

*To all whom it may concern:*

Be it known that I, HERMAN W. PAULUS, a citizen of the United States, and a resident of Richmond Hill, Long Island, in the county of Queens and State of New York, have invented certain new and useful Improvements in Evaporators, of which the following is a specification.

The present invention relates to evaporators and more particularly to evaporators adapted for use in concentrating acids and the like.

The rate of evaporation of liquids, as is well known, depends upon the area of the heating surface and the temperature to which it is raised. Heretofore it has been customary to construct acid evaporators in the form of a relatively large open kettle enamelled on its interior surface and provided externally with a jacket or other means by which the heating means is applied to the kettle to concentrate the acid. In practice such kettles have been found disadvantageous in many particulars. The heating surface is relatively small. Where steam is used as the heating medium it must be kept at a relatively low pressure because of the difficulty of constructing a kettle of the necessary strength. It is difficult to produce a large enamelled surface without flaws and defective spots. The metal kettle is soon attacked by the acid through these spots and the whole surface must be renovated. This also happens if the enamel is accidentally chipped during use. In addition to the losses and delays incurred by defective enamelled kettles, the solutions are often contaminated by contact with the metal at the defective spots.

One object of the present invention is to produce an evaporator of such construction that it will have a relatively large heating surface by which the concentration of the acid solutions and other liquors will be effected more expeditiously than is possible in evaporators as at present constructed. A further object of the invention is to produce an evaporator of such construction that its initial cost of manufacture will be cheaper than kettles or evaporators with relatively large enamelled surfaces and such that the cost of renovating a defective spot will be relatively small. These and other objects, which will be pointed out as the description of the invention proceeds, are accomplished by the improved evaporator described in the following specification and particularly defined in the appended claims.

In the accompanying drawings illustrating the preferred form of the invention, Fig. 1 is a vertical transverse section through the improved evaporator, and Fig. 2 is a vertical longitudinal section through the evaporator.

The improved evaporator as illustrated in the drawings comprises an outer receptacle or tank 6 composed of concrete or other like material. The interior of the tank 6 is provided with an inner surface or lining 8 composed of an acid proof material such as stoneware. Between the outer casing 6 and the lining 8 is an interposed binder of cement 9. Although the tank may be of any shape it is found convenient to make it rectangular so that it may be extended to any desired length for the addition of extra units of the heating medium. The acid solution or other liquor to be evaporated or concentrated is introduced into the tank through its open top and the concentrated liquor is drawn from the evaporator through the discharge opening 10 formed in the bottom of the tank. A valve 12 normally keeps the discharge opening 10 closed. The valve 12 is provided with a valve stem 13 extending to the top of the tank where it is pivotally connected with a lever 14 fulcrumed on a bracket 15 resting on the top of the tank. The lever 14 is manipulated by a handle 16. It will be noted that this construction of evaporator tank or vessel can be produced at relatively low cost and that if defects develop in the acid-resisting lining of the tank, it may be repaired or renovated at short notice and at small expense and with but little delay in the operations.

In order to secure as large a heating surface or area as possible, the heating medium consists of a series of independent units or coils generally indicated by the reference character 18. Each heating coil 19 consists of an enamelled metal tube bent into U shape to conform to the rounded bottom of the tank. The series of tubes 19 extend throughout the length of the tank and are connected at one end with a supply pipe or header 20 and at the other end with a discharge pipe or header 21. The headers 20 and 21 are connected by spreaders 22. The heating medium 18 as thus constructed is lowered into and raised from the tank by means of a hoisting device 23 manipulated by a windlass 24 and connected with the heating medium 18 by means of the chains 25. The supply and discharge pipes connected with the headers 20 and 21 have flexible connections to permit the raising and lowering of the heating medium. When the heating medium is in position in the tank the headers 20 and 21 rest upon the supports 26.

Owing to the relatively small size of each heating tube or coil 19 steam at relatively high pressure can be safely introduced into the coils to effect the ebullition of the liquor and hence the rapid concentration thereof. Inasmuch as each coil is immersed in or completely surrounded by the liquor a larger area of the liquor is in contact with the heating surface in this form of heating medium than in the case of a jacketed kettle, hence the evaporation is more expeditiously performed. Where viscous liquors are treated, this form of heating means has apparent advantages over the jacketed kettle type. Moreover, if the enamelled surface of one of the individual tubes or coils 19 is damaged it can be readily replaced without noticeably delaying the operation of the evaporator.

The steam under pressure enters the coils 19 from the header 20 and condenses within the coils and accumulates in the bottom of the bend. In order to facilitate the ejection of the condensate from the coils, each coil is provided at its discharge end with a small tube 28, the upper end of which projects into the discharge header 21. The coils 19 are closed at the point 29 by flanges so as to prevent the steam from escaping up through this end of the coils. Thus the condensate in the bottom of the coils is subjected to the pressure of the incoming live steam and is ejected through the upper end of the tubes 28 and into the discharge header 21. The discharge end of the coils 19 is provided below the closed point 29 with automatic relief valves 30 to prevent accumulation of air in the coils. By continuously discharging the condensate from the coils the entire heating surface of the coils is assured throughout the continued operation of the apparatus.

The operation of the evaporator is simple. The tank is filled to a convenient level with the acid solution or other liquor to be concentrated and the heating coils are lowered into the liquor. The steam or other heating fluid is turned on and by reason of the relatively large heating surface of the heating medium the evaporation or condensation is rapidly effected. When the liquor has been concentrated to the desired point, the heating coils are raised and the concentrated liquor is drawn off. Or the operation may be made continuous by continuously discharging a small portion of the heavy concentrate at the bottom of the tank and admitting an equivalent portion of fresh solution at the top of the tank. During the concentrating operation the heating coils are maintained at their maximum efficiency by reason of the condensate discharge tubes 28 through which a continuous stream of condensate passes into the discharge header 21.

It will be recognized that the evaporator of the present invention comprises an acid proof tank and that the heating medium for effecting the evaporation condensation of liquors to be treated comprises replaceable and renewable acid resistant heating units of relatively large heating area. So far as is known it has not heretofore been proposed to produce evaporators of acid proof tanks with replaceable acid resistant heating units. It will also be recognized that the evaporator may be used as an apparatus for cooling liquors, in which case water or other cooling means will be admitted to the coils 19.

Having thus indicated the nature of the present invention and described and illustrated the preferred form in which it is embodied, what I claim as new is:—

1. An evaporator comprising an acid proof tank for containing the liquor to be concentrated and a heating element consisting of an inlet header, a discharge header and a series of U-shaped replaceable tubes connecting the headers and adapted to be immersed in the liquor.

2. An evaporator comprising an acid proof tank for containing the liquor to be concentrated and a heating element consisting of an inlet header, a discharge header, and a series of separate, replaceable heating tubes connecting the two headers and adapted to be immersed in the liquor.

3. An evaporator comprising a tank for containing the liquor to be treated, a U-shaped heating unit arranged to be lowered into the liquor, means for supplying the unit with a heating fluid, and a small pipe arranged in the discharge end of the heating unit to convey away the used heating fluid.

4. An evaporator comprising a tank containing the liquor to be treated, a U-shaped heating tube, means for supplying steam through one end of the tube, the discharge end of the tube being closed except for a small aperture, and a relatively small tube in the discharge end of the heating tube and passing through the aperture through which the condensate is discharged from the heating tube.

5. An evaporator comprising a tank for containing the liquor to be treated, a bent heating tube arranged to be inserted in the liquor, said heating tube being open at one end and closed at the other, a relatively small tube passing through the closed end of the heating tube and terminating at the middle of the bend and means for supplying the open end of the tube with a heating fluid.

6. An evaporator comprising a tank, a series of U-shaped tubes adapted to be immersed in the liquor contained in the tank and means for supporting the tubes in place.

HERMAN W. PAULUS.